UNITED STATES PATENT OFFICE.

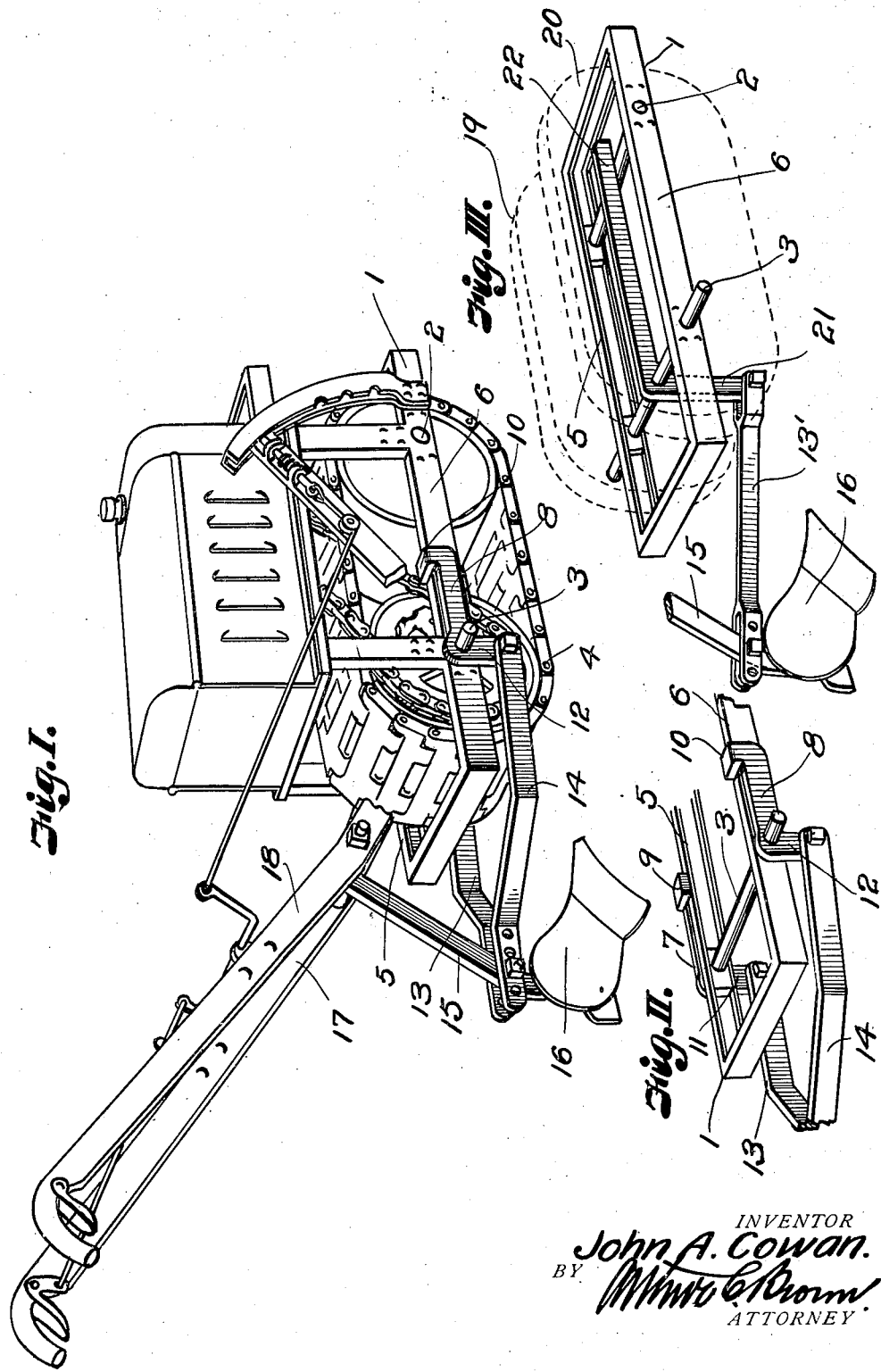

JOHN A. COWAN, OF KANSAS CITY, MISSOURI.

TRACTION DEVICE FOR VEHICLES.

1,353,318.  Specification of Letters Patent.  Patented Sept. 21, 1920.

Original application filed March 29, 1918, Serial No. 225,458. Divided and this application filed March 14, 1919. Serial No. 282,653.

*To all whom it may concern:*

Be it known that I, JOHN A. COWAN, a citizen of the United States, residing at Kansas City, in the county of Jackson and State of Missouri, have invented certain new and useful Improvements in Traction Devices for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This application is a division of an application filed by me on or about March 29, 1918, Serial No. 225,458, for "cultivator" and the primary object thereof is to provide a cultivator of such construction that means is provided whereby the resistance against the ground working tool will tend to hold the forward portion of the cultivator frame against raising. In actual practice it has been found that the forward part of the cultivator propelling devices, particularly tractors, have a tendency to raise when the ground working tool encounters a considerable resistance in the ground and it is the purpose of my invention to prevent the upward tilting of the forward portion of the tractor or other devices as well as to vary the traction directly with the resistance encountered by the ground working tool.

In the drawings,

Figure I is a perspective view of a tractor and ground working tool constructed in accordance with my invention.

Fig. II is a detail perspective view of part of the frame showing the means for exerting downward pressure upon the frame proportionate to the resistance exerted against the ground working tool, and Fig. III is a slightly modified form of the device.

Referring now to the drawings by numerals of reference:

1 designates an appropriate frame in which there is a front axle 2 and a rear axle 3 which carry appropriate rollers or wheels to drive a suitable traction device or shoes 4. The frame is shown as substantially rectangular and is provided with side bars 5 and 6 and on the rear axle 3 are pivoted elbow levers 7 and 8 having in-turned projections 9 and 10 bearing against the upper edges of the side bars 5 and 6. The downwardly projecting extensions 11 and 12 of the elbow levers are connected to the links 13 and 14 which in turn are connected to the standard 15 of the ground working tool 16, said ground working tool standard being also connected to the handles 17 and 18, as fully described in my companion application of which this is a division.

From the above description, it will be obvious that as the ground working tool is drawn through the ground, the pull exerted by the links 13 and 14 upon the downwardly projecting ends 11 and 12 will have a tendency to cause the elbow levers to swing on the rear axle 3 so that the inwardly projecting portions 9 and 10 will exert a downward pressure on the side bars 5 and 6 of the frame 1 and thereby resist any tendency of the frame to tilt upwardly and in addition to this, the traction on the ground will be varied directly with the resistance encountered by the ground working tool.

In Fig. III I have shown the device as being applicable to a form of tractor in which the shoes or links do not extend entirely across the machine but on which there are two separate traction belts 19 and 20, shown in dotted lines, and in this form, the elbow lever 21 is pivoted to the rear axle 3 in the center of the machine with the forward extension 22 of said lever bearing against the front axle to exert a greater leverage on the forward part of the frame 1 and this construction enables the engine to be carried on the frame in an under-slung support. The generic principle, however, involved is substantially the same as that shown in Figs. I and II.

Having thus described my invention, what I claim as new therein, and desire to secure by Letters-Patent is:

1. In a vehicle, a frame having a forward wheel carrying axle and a rear wheel carrying axle, a ground working tool, an elbow lever pivotally connected to the frame and having a downwardly projecting extension, and a connection between the ground working tool and the downwardly projecting extension on the lever whereby pressure exerted against the ground working tool will cause the forward part of the lever to exert a downward pressure against a part on the vehicle to prevent the forward part of the vehicle from tilting in an upward direction.

2. In a vehicle, a frame, wheels supporting said frame, a ground working tool in rear of the frame, and a pivoted device carried by the rear of the frame and having a forwardly extending projection for exerting a downward pressure on the forward part of the frame in proportion to the resistance exerted against the ground working tool.

3. In a vehicle, a frame, front and rear axles carried by said frame, wheels on said axles, a ground working tool in rear of the frame, and means carried by the frame for exerting a downward pressure upon the frame in front of the rear axle in proportion to the resistance exerted against the ground working tool.

4. In a vehicle, a frame, front and rear axles carried by said frame, wheels on said axles, a ground working tool in rear of the frame, and an elbow lever pivoted to the rear axle having a downwardly projecting arm for engagement with the ground working tool and a horizontal, forwardly projecting arm for exerting downward pressure upon the forward part of the frame in proportion to the resistance exerted against the ground working tool.

5. In a vehicle, a frame, wheels supporting said frame, an elbow lever pivoted to the rear of the frame and having a horizontal arm exerting downward pressure upon the frame at a point a substantial distance in front of the wheels and a depending arm for engagement by a ground working tool.

6. In a vehicle, a frame, an axle carried by said frame, wheels on said axle, a ground working tool in rear of the frame, and means carried by the frame for exerting a downward pressure upon the frame in front of the axle in proportion to the resistance exerted against the ground working tool.

In testimony whereof I affix my signature.

JOHN A. COWAN.